(12) United States Patent
Zhang

(10) Patent No.: US 12,256,273 B2
(45) Date of Patent: Mar. 18, 2025

(54) METHOD AND DEVICE FOR WIRELESS COMMUNICATION

(71) Applicant: Xiaobo Zhang, Shanghai (CN)

(72) Inventor: Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 373 days.

(21) Appl. No.: 17/700,513

(22) Filed: Mar. 22, 2022

(65) Prior Publication Data
US 2022/0225179 A1 Jul. 14, 2022

Related U.S. Application Data

(63) Continuation of application No. PCT/CN2020/116230, filed on Sep. 18, 2020.

(30) Foreign Application Priority Data

Sep. 27, 2019 (CN) .......................... 201910921934.1

(51) Int. Cl.
*H04W 4/00* (2018.01)
*H04W 36/00* (2009.01)
(Continued)

(52) U.S. Cl.
CPC . *H04W 36/0055* (2013.01); *H04W 36/00837* (2018.08); *H04W 36/08* (2013.01); *H04W 36/302* (2023.05); *H04W 36/326* (2023.05)

(58) Field of Classification Search
CPC ....... H04W 36/0055; H04W 36/00837; H04W 36/08; H04W 36/302; H04W 36/326;
(Continued)

(56) References Cited

U.S. PATENT DOCUMENTS

2013/0079048 A1  3/2013  Cai
2016/0344463 A1  11/2016 Kim
(Continued)

FOREIGN PATENT DOCUMENTS

CA  3054655 C  *  2/2023  ........... H04B 17/101
CA  3062936 C  *  2/2023  ........... H04B 17/318
(Continued)

OTHER PUBLICATIONS

ISR received in application No. PCT/CN2020/116230 dated Dec. 2, 2020.
(Continued)

*Primary Examiner* — Thai Dinh Hoang

(57) ABSTRACT

The present disclosure provides a method and a device for wireless communications. A first node receives a first radio signal and a second radio signal; the first radio signal is used to determine a first transmission parameter; the second radio signal is used to determine a first reception quality; a reception quality with a first adjustment is used to determine whether a connection is established to a transmitter for the first radio signal; the first transmission parameter is used to determine a first offset, a sum of the first offset and the first reception quality being equal to the reception quality with the first adjustment; the first transmission parameter is related to a distance between the first node and the transmitter for the first radio signal. The present disclosure can improve the service quality of the UE during handover.

19 Claims, 5 Drawing Sheets

(51) Int. Cl.
*H04W 36/08* (2009.01)
*H04W 36/30* (2009.01)
*H04W 36/32* (2009.01)

(58) Field of Classification Search
CPC ............ H04W 36/0094; H04W 84/06; H04W 36/0058
See application file for complete search history.

(56) References Cited

U.S. PATENT DOCUMENTS

| 2018/0220399 A1 | 8/2018 | Davydov |
| 2020/0120691 A1* | 4/2020 | Siomina ............ H04L 27/26025 |
| 2022/0124660 A1* | 4/2022 | Cheng ................... H04W 80/02 |

FOREIGN PATENT DOCUMENTS

| CN | 105306178 A | 2/2016 | |
| CN | 109327893 A | 2/2019 | |
| CN | 110072274 A | 7/2019 | |
| EP | 2911449 A1 * | 8/2015 | ............ H04W 24/08 |
| WO | WO-2022158837 A1 * | 7/2022 | ......... H04B 7/18513 |
| WO | WO-2022264150 A1 * | 12/2022 | ........ H04W 36/0083 |

OTHER PUBLICATIONS

CN201910921934.1 First Search Report dated Jul. 16, 2021.
CN201910921934.1 Notification to Grant Patent Right for Invention dated Jul. 28, 2021.
Nomor Research GmbH "Considerations on MAC Timers and on RTD Compensation Offset in Non-Terrestrial Networks(NTN)" 3GPP TSG RAN WG2 Meeting#104 r2-1818511 Nov. 2, 2018.

* cited by examiner

K transmission parameter(s) —respectively being used to determine→ K offset(s)
FIG. 11
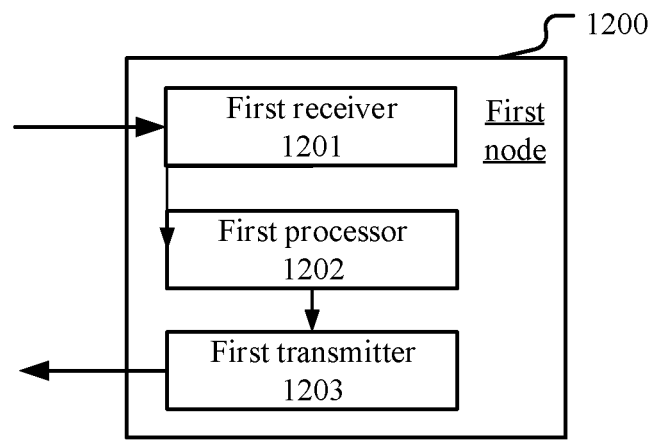
FIG. 12
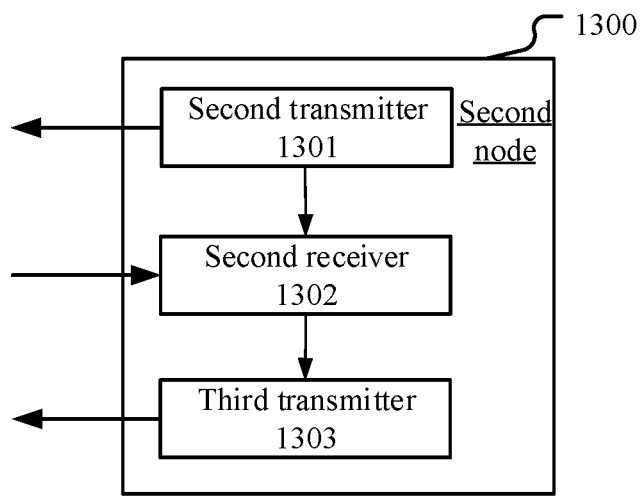
FIG. 13

METHOD AND DEVICE FOR WIRELESS COMMUNICATION

CROSS REFERENCE TO RELATED APPLICATIONS

This application is the continuation of International Patent Application No. PCT/CN2020/116230, filed on Sep. 18,2020, which claims the priority benefit of Chinese Patent Application No. 201910921934.1, filed on Sep. 27,2019, the full disclosure of which is incorporated herein by reference.

BACKGROUND

Technical Field

The present disclosure relates to transmission methods and devices in wireless communication systems, and in particular to a transmission method and device related to cell handover in wireless communications.

Related Art

With the communications requests becoming more extensive and demanding, the 3rd Generation Partner Project (3GPP) kicks off studies on Non-Terrestrial Network (NTN), and at the 3GPP RAN#80 conference it was decided that a study item (SI) of solutions to New Radio (NR)-supported NTN shall be conducted, as a continuity of the previously proposed NR-supported NTN SI (RP-171450). An information goal of the study is Handover.

In traditional macro cellular handover, a User Equipment (UE) makes measurements on information of a target cell, and selects a cell with the best Reference Signal Received Power (RSRP) or Reference Signal Received Quality (RSRQ) for access Aiming to address issues concerning traffic blowout and coverage blind areas in hot spots, a Heterogeous Network is introduced in the Long Term Evolution (LIE), and additional Picocells are deployed in a macro cellular. To enable the Picocells to include more UEs to acquire higher cell splitting gain, the 3GPP introduces the offset for cell handover, when an RSRP of a picocell plus the offset is larger than an RSRP of a macrocell, the UE will be accessed to the picocell in preference. In this way, when a larger number of micro cells are deployed in a macro cell, a greater cell splitting gain will be acquired, thus improving the network spectrum efficiency.

SUMMARY

At present the 3GPP standards are mainly set for Terrestrial Network (TN). In the handover-related measurement report, offset types that have been defined include cell specific offsets and frequency specific offsets. RadioResurceControl (RRC) Information Elements (IEs) related to offsets include OffsetFreq, cellIndividualOffset, csi-RS-IndividualOffset, a3-Offset, a6-Offset, c2-Offset, h1-ThresholdOffset, and h2-ThresholdOffset. In the environment in NTN, due to a transmission distance between the satellite and a User Equipment (UE) which is much larger than that between a terrestrial base station and the UE, the transmission delay between the satellite and the UE will be greater than the terrestrial communications. So, neither the cell specific offsets nor the frequency specific offsets can easily guarantee the service quality of the UE during handover in NTN.

To address the above problem, the present disclosure provides a solution. The statement above only took NTN scenarios for example, though; the present disclosure is also applicable to scenarios of terrestrial transmissions, where similar technical effects can be achieved. Additionally, the adoption of a unified solution for various scenarios contributes to the reduction of hardcore complexity and costs.

It should be noted that if no conflict is incurred, embodiments in any node in the present disclosure and the characteristics of the embodiments are also applicable to any other node, and vice versa. What's more, the embodiments in the present disclosure and the characteristics in the embodiments can be arbitrarily combined if there is no conflict.

The present disclosure provides a method in a first node for wireless communications, comprising:

receiving a first radio signal, and determining a first transmission parameter according to the first radio signal; receiving a second radio signal, and determining a first reception quality according to the second radio signal;

determining whether a connection is established to a transmitter for the first radio signal according to a reception quality with a first adjustment;

herein, the first transmission parameter is used to determine a first offset, a sum of the first offset and the first reception quality being equal to the reception quality with the first adjustment; the first transmission parameter is related to a distance between the first node and the transmitter for the first radio signal.

In one embodiment, a problem to be solved in the present disclosure includes: how to switch to a cell with larger time delay as late as possible when the UE is performing cell selection. The above method determines the first offset according to the first transmission parameter related to the distance between the first node and the transmitter for the first radio signal, hence the solution to the problem.

In one embodiment, characteristics of the above method include: the first transmission parameter is related to a distance between the first node and the transmitter for the first radio signal; a sum of the first offset and the first reception quality is equal to a reception quality with the first adjustment.

In one embodiment, an advantage of the above method includes: when performing cell selection, the UE can avoid a too early handover to a cell with larger time delay, thus guaranteeing the service quality of the UE during handover.

According to one aspect of the present disclosure, characterized in:

receiving a first signaling, the first signaling indicating a first candidate offset set, the first candidate offset set being comprised of multiple candidate offsets, where the first offset is one of the multiple candidate offsets;

herein, the first transmission parameter is used for determining the first offset from the first candidate offset set.

In one embodiment, characteristics of the above method include: as the first transmission parameter and the distance from the first node to the transmitter for the first radio signal varies, a set of different candidate offsets can be configured, with the first candidate offset being a best one among the candidate offset set, thus the handover performance will be further optimized.

According to one aspect of the present disclosure, characterized in: transmitting an access request signal; herein, the transmitter for the first radio signal is a target receiver for the access request signal.

According to one aspect of the present disclosure, characterized in: when the reception quality with the first adjustment continues to exceed a first reference by a first threshold and lasts till a first time length, determining to establish a connection to a transmitter for the first radio signal.

According to one aspect of the present disclosure, characterized in: when the reception quality with the first adjustment exceeds a first reference by a second threshold, determining to establish a connection to a transmitter for the first radio signal.

In one embodiment, characteristics of the above method include: only when the reception quality with the first adjustment fulfills certain conditions will the first node determine to establish a connection to a transmitter for the first radio signal, otherwise, it won't establish a connection to the transmitter for the first radio signal; the first threshold is less than the second threshold; the first threshold is configurable; the second threshold is configurable; the first time length is configurable; the first time length is RRC-configured; the transmitter for the first radio signal is a serving cell other than the current serving cell for the first node.

According to one aspect of the present disclosure, characterized in: receiving K first-type radio signal(s), and determining K transmission parameter(or parameters respectively) according to the K first-type radio signal(s); receiving K second-type radio signal(s), and determining K first-type reception quality(or qualities respectively) according to the K second-type radio signal(s); K is a positive integer;

herein, the K transmission parameter(s) is(are respectively) used to determine K offset(s); the K offset(s) corresponds(respectively correspond) to the K first-type reception quality(qualities), sum(s) of the K offset(s) and corresponding first-type reception quality(qualities) is(are respectively) equal to K first-type adjustment reception quality(qualities); the reception quality with the first adjustment is higher than a maximum first-type adjustment reception quality of the K first-type adjustment reception quality(qualities).

In one embodiment, characteristics of the above method include: a first node can measure (K+1) said first-type radio signals simultaneously and selects a said first adjustment reception quality from the (K+1) said first-type radio signals, the first adjustment reception quality is higher than a highest one of the K first-type adjustment reception quality(qualities), thus ensuring that the first node selects to switch to a second node.

The present disclosure provides a method in a second node for wireless communications, comprising:

transmitting a first radio signal, and determining a first transmission parameter according to the first radio signal; transmitting a second radio signal, and determining a first reception quality according to the second radio signal;

herein, the reception quality with the first adjustment is used to determine to establish a connection to the second node; the first transmission parameter is used to determine a first offset, a sum of the first offset and the first reception quality being equal to the reception quality with the first adjustment; the first transmission parameter is related to a distance between the first node and the transmitter for the first radio signal.

According to one aspect of the present disclosure, characterized in:

transmitting a first signaling, the first signaling indicating a first candidate offset set, the first candidate offset set being comprised of multiple candidate offsets, where the first offset is one of the multiple candidate offsets;

herein, the first transmission parameter is used for determining the first offset from the first candidate offset set.

According to one aspect of the present disclosure, characterized in: receiving an access request signal; herein, the reception quality with the first adjustment is used by a transmitter for the access request signal to determine whether a connection to the second node is established;

According to one aspect of the present disclosure, characterized in: when the reception quality with the first adjustment continues to exceed a first reference by a first threshold and lasts till a first time length, the reception quality with the first adjustment is used to determine establishing a connection to the second node.

According to one aspect of the present disclosure, characterized in: when the reception quality with the first adjustment exceeds a first reference by a second threshold, the reception quality with the first adjustment is used to determine establishing a connection to the second node.

The present disclosure provides a first node for wireless communications, comprising:

a first receiver, used for receiving a first radio signal, and determining a first transmission parameter according to the first radio signal; receiving a second radio signal, and determining a first reception quality according to the second radio signal;

a first processor, used for determining whether a connection is established to a transmitter for the first radio signal according to a reception quality with a first adjustment;

herein, the first transmission parameter is used to determine a first offset, a sum of the first offset and the first reception quality being equal to the reception quality with the first adjustment; the first transmission parameter is related to a distance between the first node and the transmitter for the first radio signal.

According to one aspect of the present disclosure, characterized in: the first receiver, receiving a first signaling, the first signaling indicating a first candidate offset set, the first candidate offset set being comprised of multiple candidate offsets, where the first offset is one of the multiple candidate offsets; herein, the first transmission parameter is used for determining the first offset from the first candidate offset set.

According to one aspect of the present disclosure, characterized in: a first transmitter, transmitting an access request signal; herein, the transmitter for the first radio signal is a target receiver for the access request signal.

According to one aspect of the present disclosure, characterized in: when the reception quality with the first adjustment continues to exceed a first reference by a first threshold and lasts till a first time length, the first processor determines to establish a connection to the transmitter for the first radio signal.

According to one aspect of the present disclosure, characterized in: when the reception quality with the first adjustment exceeds a first reference by a second threshold, the first processor determines to establish a connection to the transmitter for the first radio signal.

According to one aspect of the present disclosure, characterized in: the first receiver receiving K first-type radio signal(s), and determining K transmission parameter(or parameters respectively) according to the K first-type radio signal(s); receiving K second-type radio signal(s), and determining K first-type reception quality(or qualities respectively) according to the K second-type radio signal(s); K is a positive integer;

herein, the K transmission parameter(s) is(are respectively) used to determine K offset(s); the K offset(s) corresponds(respectively correspond) to the K first-type reception quality(qualities), sum(s) of the K offset(s) and corresponding first-type reception quality(qualities) is(are respectively)

equal to K first-type adjustment reception quality(qualities); the reception quality with the first adjustment is higher than a maximum first-type adjustment reception quality of the K first-type adjustment reception quality(qualities).

The present disclosure provides a second node for wireless communications, comprising:

a second transmitter, used for transmitting a first radio signal, and determining a first transmission parameter according to the first radio signal; transmitting a second radio signal, and determining a first reception quality according to the second radio signal;

herein, a reception quality with a first adjustment is used to determine whether a connection to the second node is established; the first transmission parameter is used to determine a first offset, a sum of the first offset and the first reception quality being equal to the reception quality with the first adjustment; the first transmission parameter is related to a distance between the first node and the second node.

According to one aspect of the present disclosure, characterized in: a third transmitter, transmitting a first signaling, the first signaling indicating a first candidate offset set, the first candidate offset set being comprised of multiple candidate offsets, where the first offset is one of the multiple candidate offsets; herein, the first transmission parameter is used for determining the first offset from the first candidate offset set.

According to one aspect of the present disclosure, characterized in: a second receiver, receiving an access request signal; herein, the reception quality with the first adjustment is used by a transmitter for the access request signal to determine whether a connection to the second node is established;

According to one aspect of the present disclosure, characterized in: when the reception quality with the first adjustment continues to exceed a first reference by a first threshold and lasts till a first time length, the reception quality with the first adjustment is used to determine establishing a connection to the second node.

According to one aspect of the present disclosure, characterized in: when the reception quality with the first adjustment exceeds a first reference by a second threshold, the reception quality with the first adjustment is used to determine establishing a connection to the second node.

In one embodiment, compared with the prior art, the present disclosure is advantageous in the following aspects:

When there is a long communication distance between a UE and a base station, particularly when relating to satellite communications, a transmission delay between the UE and the base station is much larger than traditional terrestrial communications. The distance-related offset proposed by the present disclosure can make sure that a UE keeps in connection with a smaller-delay base station in NTN environment to the best of its ability, thus guaranteeing the service quality offered by the UE during handover in NTN.

BRIEF DESCRIPTION OF THE DRAWINGS

Other features, objects and advantages of the present disclosure will become more apparent from the detailed description of non-restrictive embodiments taken in conjunction with the following drawings:

FIG. 11 illustrates a schematic diagram of K candidate offset(s) being respectively used to determine K offset(s) according to one embodiment of the present disclosure.

FIG. 12 illustrates a structure block diagram of a processing device used in a first node according to one embodiment of the present disclosure.

FIG. 13 illustrates a structure block diagram of a processing device used in a second node according to one embodiment of the present disclosure.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
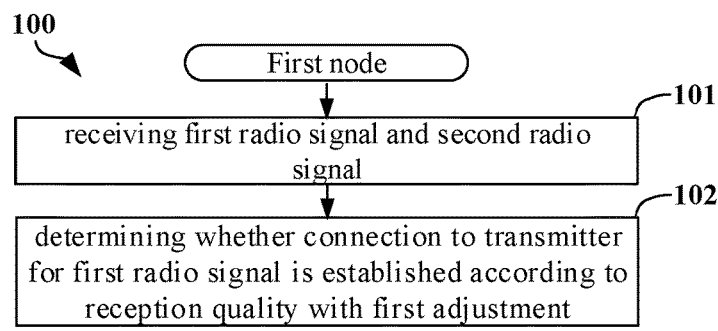
FIG. 1 illustrates a flowchart of a first radio signal, a second radio signal and reception quality with a first adjustment according to one embodiment of the present disclosure.

Embodiment 1 illustrates a flowchart of transmitting a first radio signal, a second radio signal and a reception quality with a first adjustment according to one embodiment of the present disclosure, as shown in FIG. 1. In FIG. 1, each step represents a step, it should be particularly noted that the sequence order of each box herein does not imply a chronological order of steps marked respectively by these boxes.

In Embodiment 1, the first node in the present disclosure receives the first radio signal and the second radio signal in step 101; determines in step 102 whether a connection is established to a transmitter for the first radio signal according to a reception quality with a first adjustment; the first radio signal is used for determining a first transmission parameter; the second radio signal is used for determining a first reception quality; In Embodiment 1, the first transmission parameter is used to determine a first offset, a sum of the first offset and the first reception quality being equal to the reception quality with the first adjustment; the first transmission parameter is related to a distance between the first node and the transmitter for the first radio signal.

In one embodiment, the first radio signal comprises a Timing Advance Command, and the first transmission parameter comprises a Timing Advance Value indicated by the Timing Advance Command.

In one embodiment, the first radio signal indicates a transmit power for the second radio signal, the first transmission parameter being equal to a difference between the transmit power for the second radio signal and the first reception quality.

In one embodiment, the first radio signal indicates a transmit power for the second radio signal, the first transmission parameter being a pathloss from a transmitter for the first radio signal to the first node.

In one subembodiment, the first radio signal is transmitted on a Physical Downlink Shared CHannel (PDSCH).

In one subembodiment, the first radio signal comprises a Radio Resource Control (RRC) signaling, the RRC signaling indicating the transmit power for the second radio signal.

In one subembodiment, the transmit power for the second radio signal is measured in dBm.

In one embodiment, a transmitter for the first radio signal and a transmitter for the second radio signal are co-located.

In one embodiment, the longer the distance between the first node and the transmitter for the first radio signal, the greater the first transmission parameter.

In one embodiment, the longer the distance between the first node and the transmitter for the first radio signal, the smaller the first offset.

In one embodiment, the first offset is an integer.

In one embodiment, the first offset is less than 0.

In one embodiment, a transmitter for the first radio signal and a transmitter for the second radio signal are a same serving cell.

In one embodiment, the first radio signal and the second radio signal are Quasi Co-located (QCL).

In one embodiment, the phrase of establishing a connection to a transmitter for the first radio signal comprises: establishing a Radio Resource Control (RRC) connection to the transmitter for the first radio signal.

In one embodiment, the phrase of establishing a connection to a transmitter for the first radio signal comprises: switching from a current serving cell to a transmitter for the first radio signal, the transmitter for the first radio signal being a serving cell.

In one embodiment, the phrase of establishing a connection to a transmitter for the first radio signal comprises: a handover request of switching from a current serving cell to the transmitter for the first radio signal, the transmitter for the first radio signal being a serving cell.

In one embodiment, the second radio signal comprises a reference signal, and the first reception quality comprises a receive power for the reference signal.

In one embodiment, the second radio signal comprises a Phase Tracking Reference Signal (PTRS).

In one embodiment, the second radio signal comprises a Synchronization Signal/Physical Broadcast CHannel block (SS/PBCH block).

In one embodiment, the second radio signal comprises a Channel State Information Reference Signal (CSI-RS).

In one embodiment, the first reception quality comprises a Reference Signal Receiving Power (RSRP) obtained by measuring the CSI-RS.

In one embodiment, the first reception quality comprises a Reference Signal Receiving Quality (RSRQ) obtained by measuring the CSI-RS.

In one embodiment, the first reception quality is measured in dBm, while the first offset is measured in dB.

In one embodiment, the first reception quality is measured in mW, while the first offset is measured in mW.

In one embodiment, the first node is a UE.

In one embodiment, the first reception quality comprises an RSRP obtained by a measurement on the second radio signal.

In one embodiment, the first reception quality comprises an RSRQ obtained by a measurement on the second radio signal.

Embodiment 2

Figure 2:
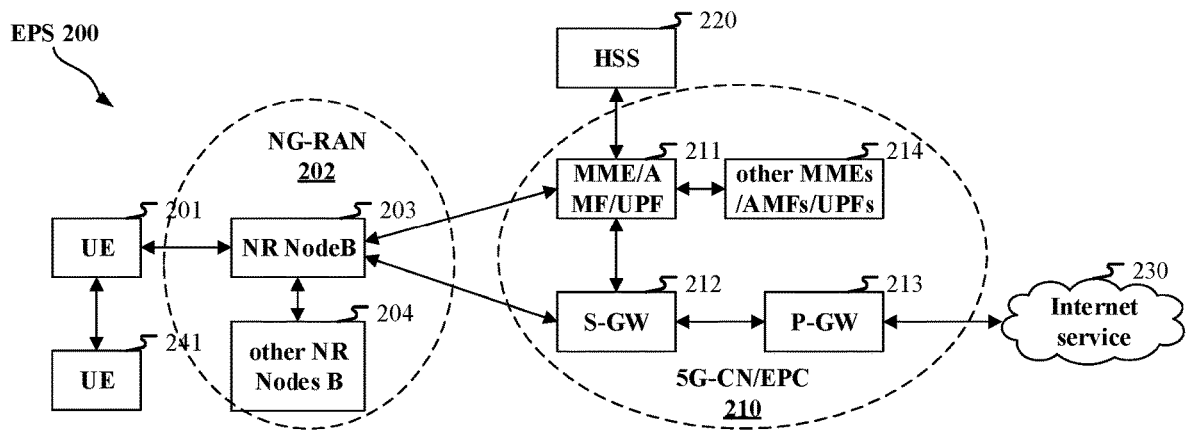
FIG. 2 illustrates a schematic diagram of a network architecture according to one embodiment of the present disclosure.

Embodiment 2 illustrates a schematic diagram of a network architecture according to the present disclosure, as shown in FIG. 2. FIG. 2 is a diagram illustrating a network architecture 200 of NR 5G, Long-Term Evolution (LTE) and Long-Term Evolution Advanced (LTE-A) systems. The NR 5G or LIE network architecture 200 may be called an Evolved Packet System (EPS) 200. The EPS 200 may comprise one or more UEs 201, an NG-RAN 202, an Evolved Packet Core/5G-Core Network (EPC/5G-CN) 210, a Home Subscriber Server (HSS) 220 and an Internet Service 230. The EPS 200 may be interconnected with other access networks. For simple description, the entities/interfaces are not shown. As shown in FIG. 2, the EPS 200 provides packet switching services. Those skilled in the art will find it easy to understand that various concepts presented throughout the present disclosure can be extended to networks providing circuit switching services or other cellular networks. The NG-RAN 202 comprises an NR node B (gNB) 203 and other gNBs 204. The gNB 203 provides UE 201 oriented user plane and control plane terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. In NTN, the gNB 203 can be a satellite or a terrestrial base station relayed through the satellite. The gNB 203 provides an access point of the EPC/5G-CN 210. Examples of UE 201 include cellular phones, smart phones, Session Initiation Protocol (SIP) phones, laptop computers, Personal Digital Assistant (PDA), Satellite Radios, Global Positioning Systems (GPSs), multimedia devices, video devices, digital audio players (for example, MP3 players), cameras, games consoles, unmanned aerial vehicles, air vehicles, narrowband physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the EPC/5G-CN 210 via an S1/NG interface. The EPC/5G-CN210 comprises MME/AMF/UPF 211, other MMEs/AMFs/UPFs 214, Service Gateway (S-GW) 212 and Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet Service 230. The Internet Service 230 comprises IP services corresponding to operators, specifically including Internet, Intranet, and IP Multimedia Subsystem (IMS).

In one embodiment, the UE 201 corresponds to the first node in the present disclosure.

In one embodiment, the UE 201 supports transmissions in NTN.

In one embodiment, the UE 201 supports transmissions in large-delay-difference networks.

In one embodiment, the gNB203 corresponds to the second node in the present disclosure.

In one embodiment, the gNB203 supports transmissions in NTN.

In one embodiment, the gNB203 supports transmissions in large-delay-difference networks.

Embodiment 3

Figure 3:
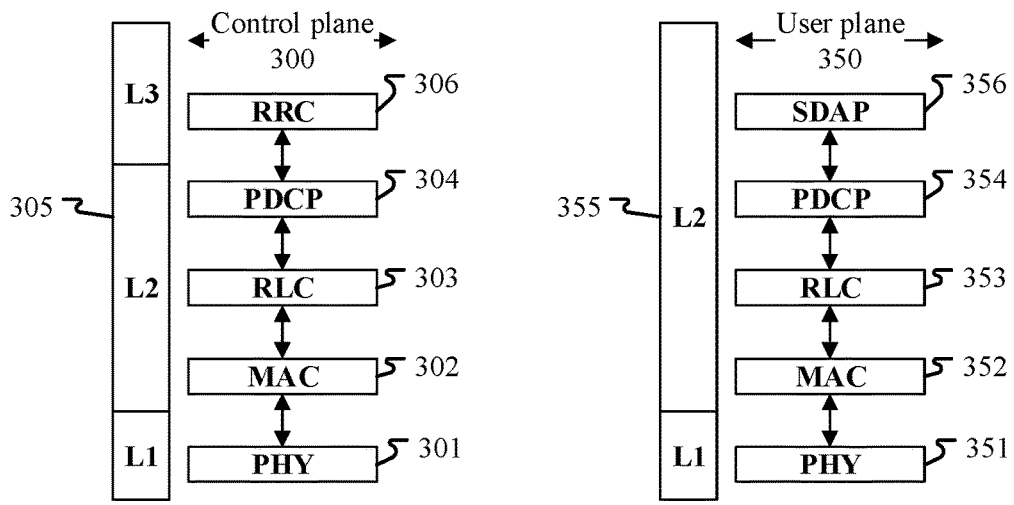
FIG. 3 illustrates a schematic diagram of a radio protocol architecture of a user plane and a control plane according to one embodiment of the present disclosure.

Embodiment 3 illustrates a schematic diagram of a radio protocol architecture of a user plane and a control plane according to the present disclosure, as shown in FIG. 3. FIG. 3 is a schematic diagram illustrating an embodiment of a radio protocol architecture of a user plane 350 and a control plane 300. In FIG. 3, the radio protocol architecture for a control plane 300 between a first node (UE, gNB or, satellite or aircraft in NTN) and a second node (gNB, UE, or satellite or aircraft in NTN), or between two UEs, is represented by three layers, which are a layer 1, a layer 2 and a layer 3, respectively. The layer 1 (L1) is the lowest layer which performs signal processing functions of various PHY layers. The L1 is called PHY 301 in the present disclosure. The layer 2 (L2) 305 is above the PHY 301, and is in charge of the link between a first node and a second node as well as between two UEs via the PHY 301. The L2 305 comprises a Medium Access Control (MAC) sublayer 302, a Radio Link Control (RLC) sublayer 303 and a Packet Data Convergence Protocol (PDCP) sublayer 304. All these sublayers terminate at the second nodes. The PDCP sublayer 304 provides multiplexing among variable radio bearers and logical channels. The PDCP sublayer 304 provides security by encrypting packets and also support for inter-cell handover of the first node between second nodes. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between first nodes various radio resources (i.e., resource block) in a cell. The MAC sublayer 302 is also in charge of HARQ operation. In the control plane 300, The RRC sublayer 306 in the L3 layer is responsible for acquiring radio resources (i.e., radio bearer) and configuring the lower layer using an RRC signaling between the second node and the first node. The radio protocol architecture in the user plane 350 comprises the L1 layer and the L2 layer. In the user plane 350, the radio protocol architecture used for the first node and the second node in a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also comprises a Service Data Adaptation Protocol (SDAP) sublayer 356, which is in charge of the mapping between QoS streams and a Data Radio Bearer (DRB), so as to support diversified traffics. Although not described in FIG. 3, the first node may comprise several higher layers above the L2 355, such as a network layer (i.e., IP layer) terminated at a P-GW 213 of the network side and an application layer terminated at the other side of the connection (i.e., a peer UE, a server, etc.).

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the first radio signal in the present disclosure is generated by the RRC306.

In one embodiment, the first radio signal in the present disclosure is generate by the MAC302 or the MAC352.

In one embodiment, the first radio signal in the present disclosure is generated by the PHY301 or the PHY351.

In one embodiment, the second radio signal in the present disclosure is generated by the PHY301 or the PHY351.

In one embodiment, the first signaling in the present disclosure is generated by the RRC 306.

In one embodiment, the first signaling in the present disclosure is generate by the MAC302 or the MAC352.

In one embodiment, the first signaling in the present disclosure is generated by the PHY301 or the PHY351.

In one embodiment, the access request signal in the present disclosure is generated by the RRC306.

In one embodiment, the access request signal in the present disclosure is generate by the MAC302 or the MAC352.

In one embodiment, the access request radio signal in the present disclosure is generated by the PHY301 or the PHY351.

Embodiment 4

Figure 4:
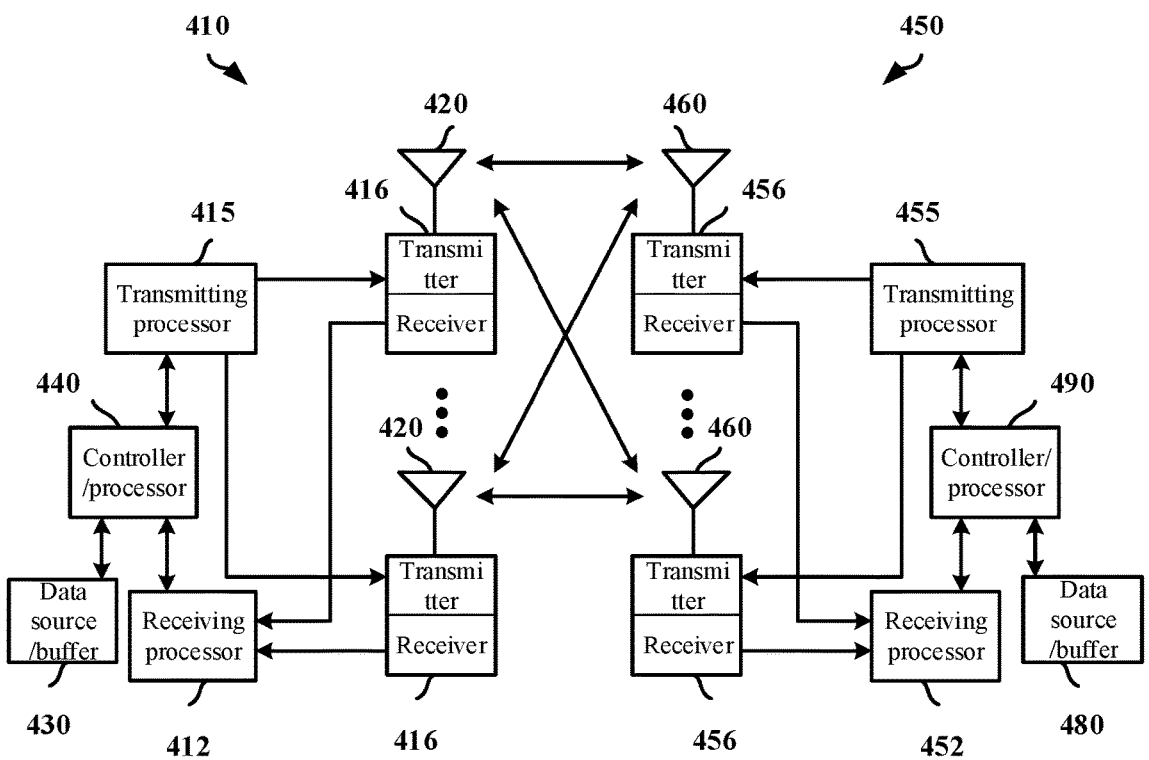
FIG. 4 illustrates a schematic diagram of a first node and a second node according to one embodiment of the present disclosure.

Embodiment 4 illustrates a schematic diagram of a first node and a second node according to the present disclosure, as shown in FIG. 4.

The first node (450) comprises a controller/processor 490, a data source/buffer 480, a receiving processor 452, a transmitter/receiver 456 and a transmitting processor 455, where the transmitter/receiver 456 comprises an antenna 460. The data source/buffer 480 provides a higher layer packet to the controller/processor 490, and the controller/processor 490 provides header compression and decompression, encryption and decryption, packet segmentation and reordering, as well as multiplexing and de-multiplexing between logical and transport channels, so as to implement the protocols for L2 and above layers in the user plane and the control plane, the higher layer packet can comprise data or control information, such as a DL-SCH or UL-SCH or an SL-SCH. The transmitting processor 455 provides various signal transmitting processing functions used for the L1 (that is, PHY), including coding, interleaving, scrambling, modulation, power control/allocation, precoding and physical layer control signaling generation. The receiving processor 452 provides various signal receiving processing functions used for the L1 (that is, PHY), including decoding, de-interleaving, de-scrambling, demodulation, de-precoding and physical layer control signaling extraction. The transmitter 456 converts a baseband signal provided by the transmitting processor 455 into a radio frequency signal to be transmitted via the antenna 460, and then the receiver 456 is used to convert the radio frequency signal received via the antenna 460 into a baseband signal to be provided to the receiving processor 452.

The second node (410) can comprise a controller/processor 440, a data source/buffer 430, a receiving processor 412, a transmitter/receiver 416 and a transmitting processor 415, where the transmitter/receiver 416 comprises an antenna 420. A higher-layer packet is provided by the data source/buffer 430 to the controller/processor 440, and the controller/processor 440 provides header compression and decompression, encryption and decryption, packet segmentation and reordering as well as multiplexing and demultiplexing between a logical channel and a transport channel so as to implement the L2 layer protocols used for the user plane and the control plane. The higher layer packet can comprise data or control information, such as a DL-SCH or UL-SCH or an SL-SCH. The transmitting processor 415 provides various signal transmitting processing functions used for the L1 (that is, PHY), including coding, interleaving, scrambling, modulation, power control/allocation, precoding and generation of physical layer control signaling (including synchronization signal and reference signal). The receiving processor 412 provides various signal receiving processing functions used for the L1 (that is, PHY), including decoding, de-interleaving, de-scrambling, demodulation, de-precoding and physical layer signaling extraction. The transmitter 416 is configured to convert a baseband signal provided by the transmitting processor 415 into a radio frequency signal to be transmitted via the antenna 420, and the receiver 416 is used to convert the radio frequency signal received via the antenna 420 into a baseband signal, which will be provided to the receiving processor 412.

In Downlink (DL), a higher layer packet, for instance higher-layer information contained in the first signaling and an access request signal in the present disclosure is provided to the controller/processor 440. The controller/processor 440 provides functions of the L2 layer and above. In DL, the controller/processor 440 provides header compression, encryption, packet segmentation and reordering, multiplexing between a logical channel and a transport channel as well as radio resources allocation for the first node 450 based on various priorities. The controller/processor 440 is also responsible for HARQ operation, a retransmission of a lost packet and a signaling to the first node 450, for instance, higher-layer information (if included) in the first radio signal, the second radio signal, the first signaling and the access request signal in the present disclosure is generated in the controller/processor 440. The transmitting processor 415 provides various signal processing functions used for the L1 (that is, PHY), including coding, interleaving, scrambling, modulation, power control/allocation, precoding and physical layer control signaling generation, for instance, physical layer signal generation such as the first signaling and the access request signal in the present disclosure is completed in the transmitting processor 415. Modulation symbols generated are divided into parallel streams and each stream is mapped to a corresponding multicarrier subcarrier and/or multicarrier symbol, and is then mapped from the transmitting processor 415 to the antenna 420 via the transmitter 416 to be transmitted in the form of radio frequency signals. At the receiving end, each receiver 456 receives a radio frequency signal via a corresponding antenna 460, and recovers baseband information modulated onto a radio frequency carrier and provides the baseband information to the receiving processor 452. The receiving processor 452 performs various signal receiving processing functions used for the L1. Signal receiving processing functions include receiving physical layer signals corresponding to the first radio signal, the second radio signal, the first signaling and the access request signal in the present disclosure, demodulating multicarrier symbols in multicarrier symbol streams based on varied modulation schemes (such as BPSK, QPSK) and then de-scrambling, decoding and de-interleaving to recover data or control signal transmitted by the second node 410 on a physical channel, after wards providing the data and control signal to the controller/processor 490. The controller/processor 490 is in charge of the L2 and above layers, the controller/processor 490 interprets higher-layer information (if included) in the first signaling and the access request signal in the present disclosure. The controller/processor can be associated with the memory 480 that stores program code and data; the memory 480 may be called a computer readable medium.

In UL transmission, the data source/buffer 480 is used to provide higher-layer data to the controller/processor 490. The data source/buffer 480 represents the L2 and all protocol layers above it. The controller/processor 490 provides header compression, encryption, packet segmentation and reordering as well as multiplexing between logical and transport channels based on radio resources allocation for the second node 410 to perform the L2 protocols used for the user plane and the control plane. The controller/processor 490 is responsible for HARQ operation, retransmission of a lost packet and a signaling to the second node 410. The access request signal in the present disclosure is generated by the controller/processor 490. The transmitting processor 455 provides various signal transmitting processing functions used for the L1 (that is, PHY), and a physical layer signal corresponding to the access request signal in the present disclosure is generated by the transmitting processor 455. Signal transmitting processing functions include coding and interleaving to promote Forward Error Correction (FEC) at the UE 450 as well as modulation on baseband signals based on each modulation scheme (such as BPSK, QPSK), dividing modulation symbols into parallel streams and mapping each stream to a corresponding multicarrier subcarrier and/or multicarrier symbol, which is then mapped to the antenna 460 by the transmitting processor 455 via the transmitter 456 to be transmitted in the form of radio frequency signals. The receiver 416 receives a radio frequency signal via a corresponding antenna 420, and each receiver 416 recovers baseband information modulated onto a radio frequency carrier and provides the baseband information to the receiving processor 412. The receiving processor 412 provides various signal receiving processing functions used for the L1 (that is, PHY), including receiving and processing a physical layer signal for the access request signal in the present disclosure, and also include acquiring multicarrier symbol streams, and demodulating multicarrier symbols in the multicarrier symbol streams based on different modulation schemes (such as BPSK, QPSK), and decoding and de-interleaving to recover data and/or control signal originally transmitted by the first node 450 on the physical channel. After that the data and/or control signal are provided to the controller/processor 440. The functionality of the L2 is implemented by the controller/processor 440, including interpreting information carried by the access request signal in the present disclosure. The controller/ processor can be associated with the buffer 430 that stores program code and data; the buffer 430 may be called a computer readable medium.

In one embodiment, the first node 450 comprises at least one processor and at least one memory, the at least one memory comprises computer program codes; the at least one memory and the computer program codes are configured to be used in collaboration with the at least one processor. The first node 450 at least: receives a first radio signal, and determines a first transmission parameter according to the first radio signal; receives a second radio signal, and determines a first reception quality according to the second radio signal; determines whether a connection is established to a transmitter for the first radio signal according to a reception quality with a first adjustment; herein, the first transmission parameter is used to determine a first offset, a sum of the first offset and the first reception quality being equal to the reception quality with the first adjustment; the first transmission parameter is related to a distance between the first node and the transmitter for the first radio signal.

In one embodiment, the first node 450 comprises a memory that stores a computer readable instruction program, the computer readable instruction program generates actions when executed by at least one processor, which include: receiving a first radio signal, and determining a first transmission parameter according to the first radio signal; receiving a second radio signal, and determining a first reception quality according to the second radio signal; determining whether a connection is established to a transmitter for the first radio signal according to a reception quality with a first adjustment; herein, the first transmission parameter is used to determine a first offset, a sum of the first offset and the first reception quality being equal to the reception quality with the first adjustment; the first transmission parameter is related to a distance between the first node and the transmitter for the first radio signal.

In one embodiment, the second node 410 comprises at least one processor and at least one memory, the at least one memory comprises computer program codes; the at least one memory and the computer program codes are configured to be used in collaboration with the at least one processor. The second node 410 at least: transmits a first radio signal, and determines a first transmission parameter according to the first radio signal; transmits a second radio signal, and determines a first reception quality according to the second radio signal; herein, determining whether a connection is established to a transmitter for the first radio signal according to a reception quality with a first adjustment; the first transmission parameter is used to determine a first offset, a sum of the first offset and the first reception quality being equal to the reception quality with the first adjustment; the first transmission parameter is related to a distance between the first node and the transmitter for the first radio signal.

In one embodiment, the second node 410 comprises a memory that stores a computer readable instruction program, the computer readable instruction program generates actions when executed by at least one processor, which include: transmitting a first radio signal, and determining a first transmission parameter according to the first radio signal; transmitting a second radio signal, and determining a first reception quality according to the second radio signal; herein, determining whether a connection is established to a transmitter for the first radio signal according to a reception quality with a first adjustment; the first transmission parameter is used to determine a first offset, a sum of the first offset and the first reception quality being equal to the reception quality with the first adjustment; the first transmission parameter is related to a distance between the first node and the transmitter for the first radio signal.

In one embodiment, the first node 450 is a UE.

In one embodiment, the first node 450 is a UE supporting large delay difference.

In one embodiment, the first node 450 is a UE supporting NTN.

In one embodiment, the first node 450 is an aircraft.

In one embodiment, the second node 410 is a base station (gNB/eNB).

In one embodiment, the second node 410 is a base station supporting large delay difference.

In one embodiment, the second node 410 is a base station supporting NTN.

In one embodiment, the second node 410 is satellite equipment.

In one embodiment, the second node 410 is a flight platform.

In one embodiment, the receiver 456 (comprising the antenna 460), the receiving processor 452 and the controller/processor 490 are used for receiving the first radio signal in the present disclosure.

In one embodiment, the receiver 456 (comprising the antenna 460), the receiving processor 452 and the controller/processor 490 are used for receiving the second radio signal in the present disclosure.

In one embodiment, the transmitter 456 (comprising the antenna 460), the transmitting processor 455 and the controller/processor 490 are used for transmitting the first signaling in the present disclosure.

In one embodiment, the receiving processor 452 determines whether a connection to the second node is established according to a reception quality with a first adjustment.

In one embodiment, the transmitter 416 (comprising the antenna 420), the transmitting processor 415 and the controller/processor 440 are used for transmitting the access request signal in the present disclosure.

Embodiment 5

Figure 5:
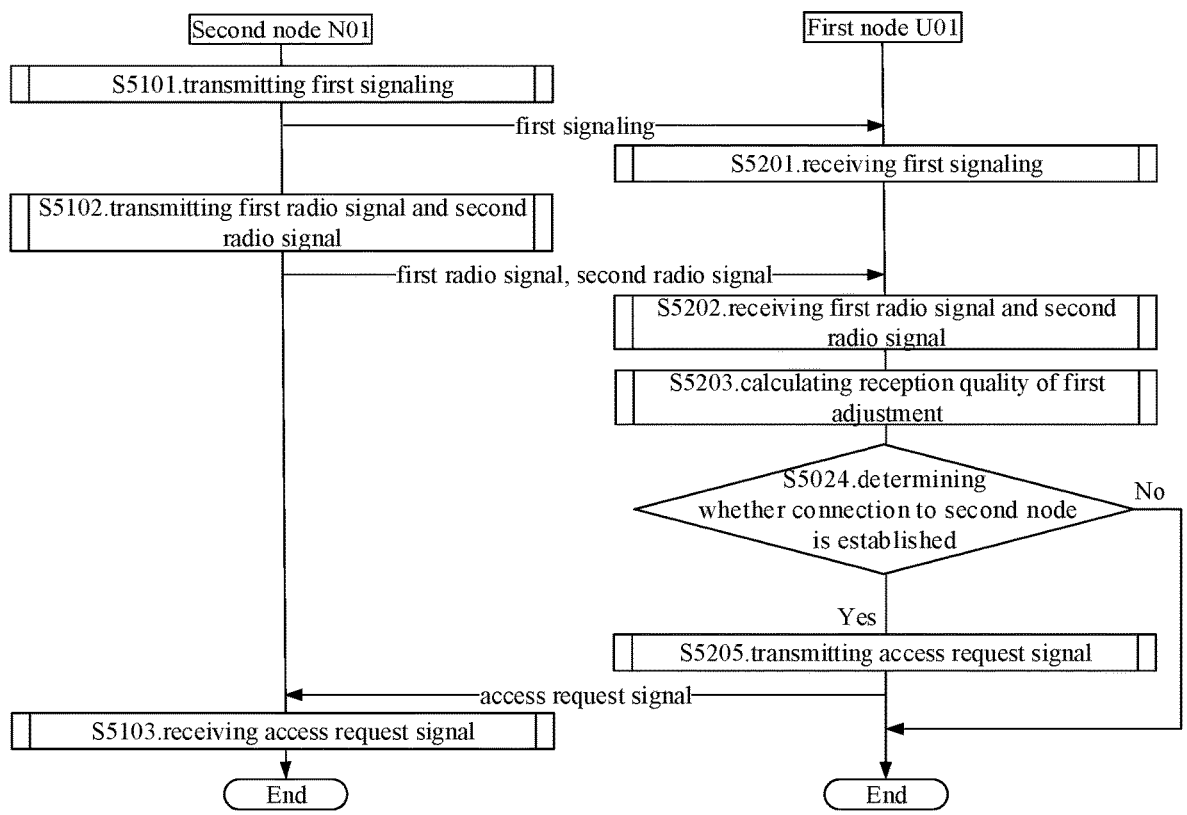
FIG. 5 illustrates a flowchart of transmission according to one embodiment of the present disclosure.

Embodiment 5 illustrates a flowchart of radio signal transmission according to one embodiment of the present disclosure, as shown in FIG. 5. In FIG. 5, a second node N01 is a base station for a serving cell for a first node U01. It should be particularly noted that the sequence illustrated herein does not set any limit on the orders in which signals are transmitted and implementations in this present disclosure.

The second node N01 transmits a first signaling in step S5101, transmits a first radio signal and a second radio signal in step S5102, and receives an access request signal in step S5103.

The first node U01 receives a first signaling in step S5201, receives a first radio signal and a second radio signal in step S5202, and calculates a reception quality with a first adjustment in step S5203, and determines in step S5204 whether a connection is established to the second node, if so, transmits an access request signal in step S5205, if not, cancels the access request signal transmission in step S5205.

In Embodiment 5, the first radio signal in the present disclosure is used to determine a first transmission parameter; the second radio signal is used for determining a first reception quality; herein, it is determined whether a connection to the second node is established according to a reception quality with a first adjustment; the first transmission parameter is used to determine a first offset, a sum of the first offset and the first reception quality being equal to the reception quality with the first adjustment; the first transmission parameter is related to a distance between the first node and the transmitter for the first radio signal.

In one embodiment, the first signaling indicates a first candidate offset set, the first candidate offset set being comprised of multiple candidate offsets, where the first offset is one of the multiple candidate offsets; herein, the first transmission parameter is used for determining the first offset from the first candidate offset set.

In one embodiment, the phrase of establishing a connection to a transmitter for the first radio signal comprises: establishing a Radio Resource Control (RRC) connection to the transmitter for the first radio signal.

In one embodiment, the phrase of establishing a connection to a transmitter for the first radio signal comprises: switching from a current serving cell to a transmitter for the first radio signal, the transmitter for the first radio signal being a serving cell.

In one embodiment, a connection between the first node U01 and the second node N01 is established on the premise that the reception quality with the first adjustment continues to exceed a first reference by a first threshold till a first time length is reached.

In one embodiment, a connection between the first node U01 and the second node N01 is established on the premise that the reception quality with the first adjustment exceeds a first reference by a second threshold.

The first reference is a base station currently in connection with the UE.

The first reference is a source base station.

In one embodiment, the first radio signal comprises a Timing Advance Command, and the first transmission parameter comprises a Timing Advance Value indicated by the Timing Advance Command.

In one embodiment, the first radio signal indicates a transmit power for the second radio signal, the first transmission parameter being equal to a difference between the transmit power for the second radio signal and the first reception quality.

In one embodiment, the first radio signal indicates a transmit power for the second radio signal, the first transmission parameter being a pathloss from a transmitter for the first radio signal to the first node.

In one embodiment, a transmitter for the first radio signal and a transmitter for the second radio signal are co-located.

In one embodiment, a transmitter for the first radio signal and a transmitter for the second radio signal are a same serving cell.

In one embodiment, the first radio signal and the second radio signal are Quasi Co-located (QCL).

In one embodiment, the second radio signal comprises a reference signal, and the first reception quality comprises a receive power for the reference signal.

In one embodiment, the second radio signal comprises a Channel State Information Reference Signal (CSI-RS).

In one embodiment, the first signaling is a higher-layer signaling.

In one embodiment, the first signaling is cell-common.

In one embodiment, the first signaling explicitly indicates the first candidate offset set.

In one embodiment, the first signaling indicates a first reference offset, the first candidate offset set being implicitly indicated by the first reference offset.

In one embodiment, the first signaling is a Measurement Control Command.

In one embodiment, the first signaling comprises partial or all fields in a ReportConfigEUTRA Information Element (IE).

In one embodiment, the first signaling comprises partial or all fields in a MeasObjectEUTRA IE.

In one embodiment, a channel occupied by the access request signal includes a Physical Random Access CHannel (PRACH); a synchronization timing for reception of the first radio signal is used to determine a transmission timing for the access request signal.

In one embodiment, the access request signal comprises an RRCconnectionRequest Information Element.

In one embodiment, a channel occupied by the access request signal includes a Physical Uplink SharedCHannel (PUSCH).

In one embodiment, the access request signal is a MeasurementReport message.

In one embodiment, the second node N01 is a target receiver for the access request signal.

In one embodiment, an identifier of the transmitter for the first radio signal is used for generating the access request signal.

Embodiment 6

Figure 6:
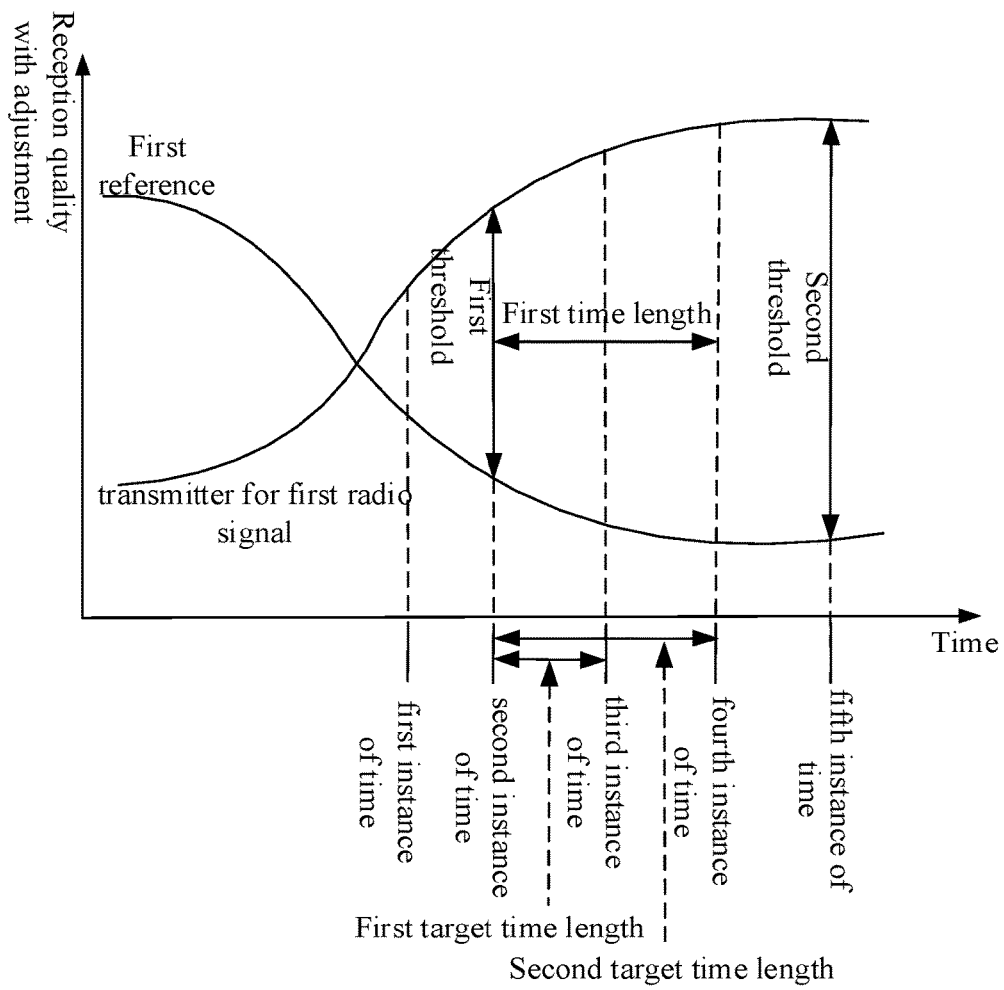
FIG. 6 illustrates a schematic diagram of a first threshold and a second threshold according to one embodiment of the present disclosure.

Embodiment 6 illustrates a schematic diagram of a first threshold and a second threshold according to one embodiment of the present disclosure, as shown in FIG. 6. In FIG. 6, the horizontal axis is time, while the vertical axis represents adjustment reception quality.

In Embodiment 6, as illustrated in FIG. 6, a difference between a third instance of time and a second instance of time is equal to a first target time length; a difference between a fourth instance of time and a third instance of time is equal to a second target time length; the first target time length is smaller than a first time length; the second target time length is equal to a first time length. A first instance of time, the second instance of time, the third instance of time, the fourth instance of time and a fifth instance of time gradually increase in order.

In one embodiment, an adjustment value of a reception quality received by a transmitter for the first radio signal is the reception quality with the first adjustment.

In one embodiment, a measurement on a reference signal transmitted by a current serving cell for the first node is used to determine the first threshold, the transmitter for the first radio signal being a serving cell other than the current serving cell for the first node.

In one embodiment, a measurement on a reference signal transmitted by a current serving cell for the first node and a distance between the current serving cell for the first node and the first node are jointly used to determine the first threshold.

In one embodiment, the first threshold is configurable.

In one embodiment, the second threshold is configurable.

In one embodiment, the first time length is configurable.

In one embodiment, the first time length is configured by an RRC layer signaling.

In one embodiment, the transmitter for the first radio signal is a serving cell other than a current serving cell for the first node, the first reference being a counterpart of the reception quality with the first adjustment in the current serving cell for the first node.

In one embodiment, the transmitter for the first radio signal is a serving cell other than a current serving cell for the first node, the first reference by a second threshold being a counterpart of the reception quality with the first adjustment in the current serving cell for the first node.

In one embodiment, the second threshold is greater than the first threshold.

In one embodiment, at the first instance of time, the reception quality with the first adjustment is lower than a first reference by a first threshold, the first processor determines not to establish a connection to a transmitter for the first radio signal.

In one embodiment, at the second instance of time, the reception quality with the first adjustment begins to exceed a first reference by a first threshold, at the third instance of time, the reception quality with the first adjustment continues to exceed the first reference by a first threshold and lasts no longer than the first time length, the first processor determines not to establish a connection to a transmitter for the first radio signal.

In one embodiment, at the second instance of time, the reception quality with the first adjustment begins to exceed a first reference by a first threshold, at the fourth instance of time, the reception quality with the first adjustment continues to exceed the first reference by a first threshold and lasts till the first time length, the first processor determines to establish a connection to the transmitter for the first radio signal. In one embodiment, at the fifth instance of time, the reception quality with the first adjustment exceeds a first reference by a second threshold, the first processor determines to establish a connection to the transmitter for the first radio signal.

Embodiment 7

Figure 7:
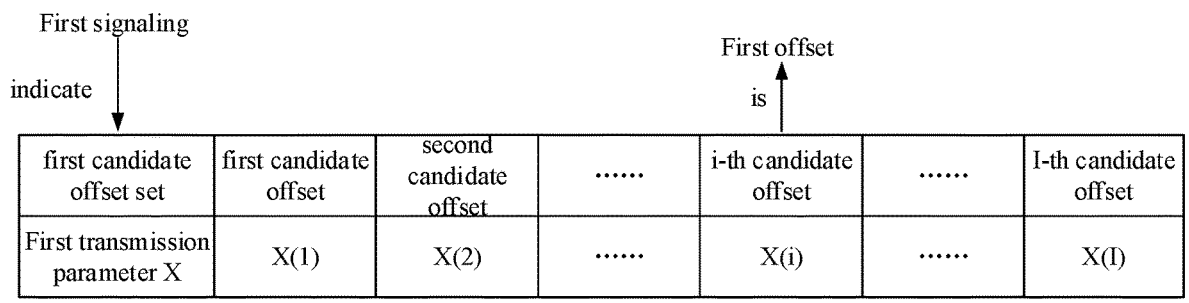
FIG. 7 illustrates a schematic diagram of a first candidate offset set according to one embodiment of the present disclosure.

Embodiment 7 illustrates a schematic diagram of a first candidate offset set according to one embodiment of the present disclosure, as shown in FIG. 7. In Embodiment 7, a first signaling indicates the first candidate offset set, the first candidate offset set being comprised of multiple candidate offsets, where the first offset is one of the multiple candidate offsets; herein, a first transmission parameter is used for determining the first offset from the first candidate offset set.

In one embodiment, the candidate offset set comprises I said candidate offset(s), where I is a positive integer.

In one embodiment, a j-th (j=1, 2 . . . , I-1, I) said candidate offset is determined by a j-th said first transmission parameter X(j).

In one embodiment, the first transmission parameter is related to a distance between the first node and the transmitter for the first radio signal.

In one embodiment, the first transmission parameter X(j) is a pathloss from the transmitter for the first radio signal to the first node.

In one embodiment, the first transmission parameter X(j) is a Timing Advance Value indicated by a Timing Advance Command In one embodiment, the longer the distance between the first node and the transmitter for the first radio signal, the greater the first transmission parameter X(j).

In one embodiment, the first offset is an i-th candidate offset in the first candidate offset set which corresponds to a maximum said first transmission parameter X(i).

In one embodiment, the first offset is an i-th candidate offset in the first candidate offset set which corresponds to a minimum said first transmission parameter X(i).

In one embodiment, any two of the multiple candidate offsets are unequal.

In one embodiment, the longer the distance between the first node and the transmitter for the first radio signal, the larger the first offset.

In one embodiment, the larger the first transmission parameter, the smaller the first offset.

In one embodiment, the first signaling is a higher-layer signaling.

In one embodiment, the first signaling is cell-common.

In one embodiment, any candidate offset in the first candidate offset set corresponds to a first transmission parameter range, the first offset being one of the multiple candidate offsets to which a corresponding transmission parameter range comprises the first transmission parameter.

In one embodiment, the first signaling explicitly indicates the first candidate offset set.

In one embodiment, the first signaling indicates a first reference offset, the first candidate offset set being implicitly indicated by the first reference offset.

In one embodiment, the first signaling comprises partial or all fields in a ReportConfigEUTRA Information Element (IE).

In one embodiment, the first signaling comprises partial or all fields in a MeasObjectEUTRA IE.

In one embodiment, the first reference offset comprises at least one of {OffsetFreq, cellIndividualOffset, csi-RS-IndividualOffset, a3-Offset, a6-Offset, c2-Offset, h1-ThresholdOffset, h2-ThresholdOffset, Hysteresis}.

In one embodiment, the first reference offset is determined jointly by at least two of {OffsetFreq, cellIndividualOffset, csi-RS-IndividualOffset, a3-Offset, a6-Offset, c2-Offset, h1-ThresholdOffset, h2-ThresholdOffset, Hysteresis}.

Embodiment 8

Figure 8:
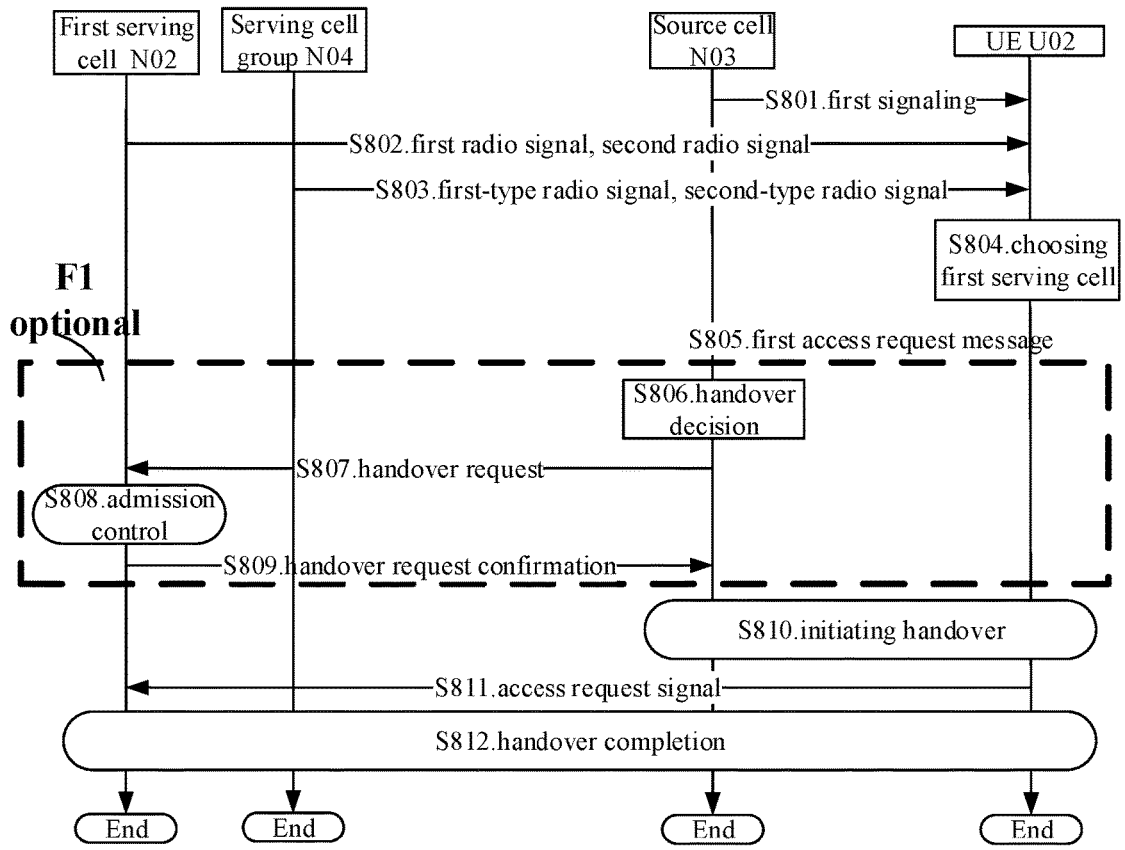
FIG. 8 illustrates a schematic diagram of a handover procedure according to one embodiment of the present disclosure.

Embodiment 8 illustrates a schematic diagram of a handover procedure according to one embodiment of the present disclosure, as shown in FIG. 8.

The UE U02 receives a first signaling message transmitted by a source cell N03 in step S801; receives a first radio signal and a second radio signal transmitted by a first serving cell N02 in step S802; receives a first-type radio signal and a second-type radio signal transmitted by a serving cell group N04 in step S803; selects the first serving cell as a target of handover in step S804; transmits a first access request signal to the source cell N03 in step S805; in step S810, the UE U02 and the first serving cell N02 jointly perform procedures relevant to initiating handover; in step S811, the UE U02 transmits an access request signal to the first serving cell N02; In step S812, the UE U02, the source cell N03 and the first serving cell N02 jointly perform procedures relevant to initiating handover.

The source cell N03 transmits a first signaling message to the UE U02 in step S801; receives a first access request signal transmitted by the UE U02 in step S805; makes a handover decision according to the first access request signal in step S806; sends a handover request message to the first serving cell in step S807; receives a handover request acknowledgment message sent from the first serving cell in step S809; in step S810, the UE U02 and the first serving cell N02 jointly perform procedures relevant to initiating handover; In step S812, the UE U02, the source cell N03 and the first serving cell N02 jointly perform procedures relevant to initiating handover.

The first serving cell N02 transmits a first radio signal and a second radio signal in step S802; receives a handover request message sent from the source cell N03 in step S807; and performs admission control in step S808; sends a handover request acknowledgment message to the source cell N03 in step S809; receives an access request signal transmitted by the UE U02 in step S811; and in step S812, the UE U02, the first serving cell N02 and the source cell N03 jointly perform procedures relevant to initiating handover.

The serving cell group N04 transmits K first-type radio signal(s) and K second-type radio signal(s) in step S803.

In one embodiment, the first radio signal is a first-type radio signal.

the K transmission parameter(s) is(are respectively) used to determine K offset(s); the K offset(s) corresponds(respectively correspond) to the K first-type reception quality (qualities), sum(s) of the K offset(s) and corresponding first-type reception quality(qualities) is(are respectively) equal to K first-type adjustment reception quality(qualities); the reception quality with the first adjustment is higher than a maximum first-type adjustment reception quality of the K first-type adjustment reception quality(qualities).

In one embodiment, the F1 module in FIG. 8 is optional.

In one embodiment, the handover decision is a HO decision message in 3GPP protocols.

In one embodiment, the handover request message is a HANDOVER REQUEST message in 3GPP protocols.

In one embodiment, the admission control is Admission Control in 3GPP protocols.

In one embodiment, the handover request acknowledgment is a HANDOVER REQUEST ACKNOWLEDGE message in 3GPP protocols. In one embodiment, the UE is the first node.

In one embodiment, the source cell is the second node.

In one embodiment, the first serving cell is the second node.

In one embodiment, the serving cell group is the second node.

In one embodiment, the first signaling explicitly indicates the first candidate offset set.

In one embodiment, the first signaling indicates a first reference offset, the first candidate offset set being implicitly indicated by the first reference offset.

In one embodiment, the first signaling is a Measurement Control Command

In one embodiment, the first signaling comprises partial or all fields in a ReportConfigEUTRA Information Element (IE).

In one embodiment, the first signaling comprises partial or all fields in a MeasObjectEUTRA IE.

In one embodiment, the first radio signal comprises a Timing Advance Command, and the first transmission parameter comprises a Timing Advance Value indicated by the Timing Advance Command In one embodiment, the first radio signal indicates a transmit power for the second radio signal, the first transmission parameter being a pathloss from a transmitter for the first radio signal to the first node.

In one embodiment, the second radio signal comprises a reference signal, and the first reception quality comprises a receive power for the reference signal.

In one embodiment, the second radio signal comprises a Channel State Information Reference Signal (CSI-RS).

In one embodiment, the first access request signal is a Measurement Report.

In one embodiment, the first access request signal is the access request signal.

In one embodiment, the triggering event is one of {eventA1, eventA2, eventA3, eventA4, eventA5, eventA6, eventB1, eventB2, eventC1, eventC2} in 3GPP protocols.

In one embodiment, the triggering event is the reception quality with the first adjustment in the present disclosure continuing to exceed the first reference by a first threshold till a first time length is reached.

In one embodiment, the triggering event is the reception quality with the first adjustment in the present disclosure exceeding the first reference by a second threshold.

In one embodiment, the triggering event is related to the reception quality with the first adjustment.

In one embodiment, the access request signal is a Measurement Report sent to the original base station by the UE.

In one embodiment, a channel occupied by the access request signal includes a Physical Random Access CHannel (PRACH); a synchronization timing for reception of the first radio signal is used to determine a transmission timing for the access request signal.

In one embodiment, the access request signal comprises an RRCconnectionRequest Information Element.

In one embodiment, a channel occupied by the access request signal includes a Physical Uplink SharedCHannel (PUSCH).

In one embodiment, an identifier of the transmitter for the first radio signal is used for generating the access request signal.

Embodiment 9

Figure 9:
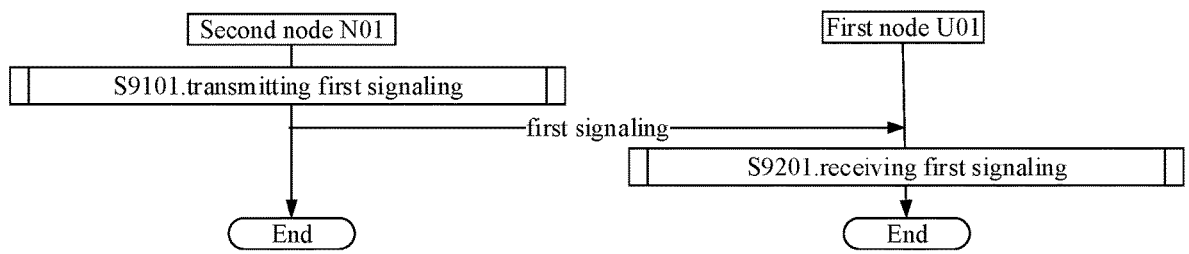
FIG. 9 illustrates a flowchart of transmission of a first signaling according to one embodiment of the present disclosure.

Embodiment 9 illustrates a flowchart of transmission of a first signaling according to one embodiment of the present disclosure, as shown in FIG. 9. In FIG. 9, a second node is a base station for a serving cell for a first node.

The second node U01 transmits a first signaling in step S9101.

The first node N01 receives a first signaling in step S9201.

In Embodiment 9, the first signaling in the present disclosure indicates a first candidate offset set, the first candidate offset set being comprised of multiple candidate offsets, where the first offset is one of the multiple candidate offsets; herein, the first transmission parameter is used for determining the first offset from the first candidate offset set.

In one embodiment, any two of the multiple candidate offsets are unequal.

In one embodiment, the longer the distance between the first node and the transmitter for the first radio signal, the larger the first offset.

In one embodiment, the larger the first transmission parameter, the smaller the first offset.

In one embodiment, the first signaling is a higher-layer signaling.

In one embodiment, the first signaling is cell-common.

In one embodiment, any candidate offset in the first candidate offset set corresponds to a transmission parameter range, the first offset being one of the multiple candidate offsets to which a corresponding transmission parameter range comprises the first transmission parameter.

In one embodiment, the first signaling explicitly indicates the first candidate offset set.

In one embodiment, the first signaling indicates a first reference offset, the first candidate offset set being implicitly indicated by the first reference offset.

In one embodiment, the first signaling comprises partial or all fields in a ReportConfigEUTRA Information Element (IE).

In one embodiment, the first signaling comprises partial or all fields in a MeasObjectEUTRA IE.

In one embodiment, the first reference offset comprises at least one of {OffsetFreq, cellIndividualOffset, csi-RS-IndividualOffset, a3-Offset, a6-Offset, c2-Offset, h1-ThresholdOffset, h2-ThresholdOffset, Hysteresis}.

In one embodiment, the first reference offset is determined jointly by at least two of {OffsetFreq, cellIndividualOffset, csi-RS-IndividualOffset, a3-Offset, a6-Offset, c2-Offset, h1-ThresholdOffset, h2-ThresholdOffset, Hysteresis}.

Embodiment 10

Figure 10:
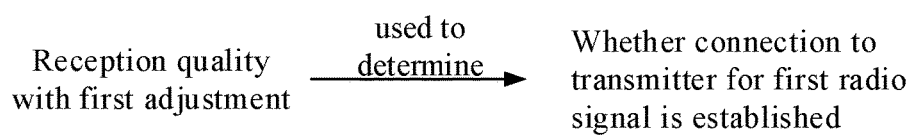
FIG. 10 illustrates a schematic diagram of reception quality with a first adjustment being used to determine whether a connection is established to a transmitter for a first radio signal according to one embodiment of the present disclosure.

Embodiment 10 illustrates a schematic diagram of a reception quality with a first adjustment being used to determine whether a connection is established to a transmitter for a first radio signal according to one embodiment of the present disclosure; as shown in FIG. 10.

In one embodiment, when a reception quality with a first adjustment exceeds a first reference by a first threshold and remains no larger than a first reference by a second threshold for shorter than the first time length, the first processor determines not to establish a connection to a transmitter for the first radio signal.

In one embodiment, the transmitter for the first radio signal is a serving cell other than a current serving cell for the first node, the second threshold being a counterpart of the reception quality with the first adjustment in the current serving cell for the first node.

In one embodiment, the transmitter for the first radio signal is a serving cell other than a current serving cell for the first node, the second threshold being greater than the first threshold.

In one embodiment, when the reception quality with the first adjustment is lower than a first reference by a first threshold, the first processor determines not to establish a connection to a transmitter for the first radio signal.

In one embodiment, when a reception quality with a first adjustment exceeds a first reference by a first threshold and remains for shorter than the first time length, the first processor determines not to establish a connection to a transmitter for the first radio signal.

In one embodiment, the first threshold is configurable.

In one embodiment, the second threshold is configurable.

In one embodiment, the first time length is configurable.

In one embodiment, the first time length is configured by an RRC layer signaling.

In one embodiment, a measurement on a reference signal transmitted by a current serving cell for the first node is used to determine the first threshold, the transmitter for the first radio signal being a serving cell other than the current serving cell for the first node.

In one embodiment, a measurement on a reference signal transmitted by a current serving cell for the first node and a distance from a current serving cell for the first node to the first node are jointly used to determine the first threshold, the transmitter for the first radio signal being a serving cell other than the current serving cell for the first node.

In one embodiment, the transmitter for the first radio signal is a serving cell other than a current serving cell for the first node, the first threshold being a counterpart of the reception quality with the first adjustment in the current serving cell for the first node.

Embodiment 11

Embodiment 11 illustrates a schematic diagram of K transmission parameter(s) being (respectively) used to determine K offset(s); as shown in FIG. 11.

In Embodiment 11, the K first-type radio signal(s) is(are respectively) used to determine K transmission parameter(s); K second-type radio signal(s) is(are respectively) used to determine K first-type reception quality(qualities). K is a positive integer; herein, the K transmission parameter(s) is(are respectively) used to determine K offset(s); the K offset(s) corresponds(respectively correspond) to the K first-type reception quality(qualities), sum(s) of the K offset(s) and corresponding first-type reception quality(qualities) is(are respectively) equal to K first-type adjustment reception quality(qualities); the reception quality with the first adjustment is higher than a maximum first-type adjustment reception quality of the K first-type adjustment reception quality(qualities).

In one embodiment, the K transmission parameter(s) is(are respectively) used to determine K offset(s).

In one embodiment, the K transmission parameter(s) is(are respectively) determined by the K first-type radio signal(s).

In one embodiment, the K offset(s) corresponds(correspond) to the K first-type reception quality(qualities respectively).

In one embodiment, sum(s) of the K offset(s) and corresponding first-type reception quality(qualities) is(are respectively) equal to K first-type adjustment reception quality (qualities).

In one embodiment, the reception quality with the first adjustment is higher than a maximum first-type adjustment reception quality of the K first-type adjustment reception quality(qualities).

In one embodiment, the K first-type radio signal(s) is(are respectively) transmitted by K serving cell(s), a transmitter for the first radio signal being a serving cell other than the K serving cell(s).

In one embodiment, the K second-type radio signal(s) is(are respectively) transmitted by the K serving cell(s).

In one embodiment, the K first-type radio signal(s) is(are respectively) transmitted by K serving cell(s), a transmitter for the first radio signal being a serving cell other than the K serving cell(s).

In one embodiment, the K transmission parameter(s) is(are respectively) counterpart(s) of a first transmission parameter in the K serving cell(s).

In one embodiment, the K first-type reception quality (qualities) is(are respectively) counterpart(s) of a first transmission parameter in the K serving cell(s).

Embodiment 12

FIG. 12 illustrates a structure block diagram of a processing device used in a first node according to one embodiment of the present disclosure; as shown in FIG. 12. In FIG. 12, a processing device 1200 in a first node is comprised of a first receiver 1201, a first processor 1202 and a first transmitter 1203.

In Embodiment 12, the first receiver 1201 receives a first radio signal, a second radio signal and a first signaling; a first processor determines whether a connection is established to a transmitter for the first radio signal according to a reception quality with a first adjustment; a first transmitter 1202 transmits an access request signal.

In Embodiment 12, the first radio signal is used to determine a first transmission parameter; the second radio signal is used for determining a first reception quality; determining whether a connection is established to a transmitter for the first radio signal according to a reception quality with a first adjustment; herein, the first transmission parameter is used to determine a first offset, a sum of the first offset and the first reception quality being equal to the reception quality with the first adjustment; the first transmission parameter is related to a distance between the first node and the transmitter for the first radio signal.

In one embodiment, the first signaling indicates a first candidate offset set, the first candidate offset set being comprised of multiple candidate offsets, where the first offset is one of the multiple candidate offsets; herein, the first transmission parameter is used for determining the first offset from the first candidate offset set.

In one embodiment, the transmitter for the first radio signal is a target receiver for the access request signal.

In one embodiment, when the reception quality with the first adjustment continues to exceed a first reference by a first threshold and lasts till a first time length, determining to transmit a message of establishing a connection to a transmitter for the first radio signal.

In one embodiment, when the reception quality with the first adjustment exceeds a first reference by a second threshold, determining to transmit a message of establishing a connection to a transmitter for the first radio signal.

In one embodiment, the first receiver 1201 receives K first-type radio signal(s), and determines K transmission parameter(or parameters respectively) according to the K first-type radio signal(s); receives K second-type radio signal(s), and determines K first-type reception quality(or qualities respectively) according to the K second-type radio signal(s); K is a positive integer; herein, the K transmission parameter(s) is(are respectively) used to determine K offset(s); the K offset(s) corresponds(respectively correspond) to the K first-type reception quality(qualities), sum(s) of the K offset(s) and corresponding first-type reception quality (qualities) is(are respectively) equal to K first-type adjustment reception quality(qualities); the reception quality with the first adjustment is higher than a maximum first-type adjustment reception quality of the K first-type adjustment reception quality(qualities).

In one embodiment, the first node 1400 is a UE.

In one embodiment, the first node 1400 is a UE supporting large delay difference.

In one embodiment, the first node 1400 is a UE supporting NTN.

In one embodiment, the first node 1400 is an aircraft.

In one embodiment, the first receiver 1201 comprises at least one of the antenna 452, the receiver 454, the receiving processor 456, the multi-antenna receiving processor 458, the controller/processor 459, the memory 460 or the data source 467 in Embodiment 4.

In one embodiment, the first processor 1202 comprises at least one of the receiver 454, the receiving processor 456, the multi-antenna receiving processor 458, the controller/processor 459 or the memory 460 in Embodiment 4.

In one embodiment, the first transmitter 1203 comprises at least one of the antenna 452, the transmitter 454, the transmitting processor 468, the multi-antenna transmitting processor 457, the controller/processor 459, the memory 460 or the data source 467 in Embodiment 4.

Embodiment 13

Embodiment 13 illustrates a structure block diagram of a processing device used in a second node according to one embodiment of the present disclosure; as shown in FIG. 13. In FIG. 13, a processing device 1300 in a second node is comprised of a second transmitter 1301, a second receiver 1302 and a third transmitter 1303.

In Embodiment 13, the second transmitter 1301 transmits a first radio signal and a second radio signal; the second receiver 1302 receives an access request signal; the third transmitter 1303 transmits a first signaling.

In Embodiment 13, the first radio signal is used to determine a first transmission parameter; the second radio signal is used for determining a first reception quality; herein, the reception quality with the first adjustment is used to determine whether a connection to the second node is established; the first transmission parameter is used to determine a first offset, a sum of the first offset and the first reception quality being equal to the reception quality with the first adjustment; the first transmission parameter is related to a distance between the first node and the transmitter for the first radio signal.

In one embodiment, the first signaling indicates a first candidate offset set, the first candidate offset set being comprised of multiple candidate offsets, where the first offset is one of the multiple candidate offsets; herein, the first transmission parameter is used for determining the first offset from the first candidate offset set.

In one embodiment, the transmitter for the first radio signal is a target receiver for the access request signal.

In one embodiment, when the reception quality with the first adjustment continues to exceed a first reference by a first threshold and lasts till a first time length, determining to transmit a message of establishing a connection to a transmitter for the first radio signal.

In one embodiment, when the reception quality with the first adjustment exceeds a first reference by a second threshold, determining to transmit a message of establishing a connection to a transmitter for the first radio signal.

In one embodiment, the second node 1300 is a base station (gNB/eNB).

In one embodiment, the second node 1300 is a base station supporting large delay difference.

In one embodiment, the second node 1300 is a base station supporting NTN.

In one embodiment, the second node 1300 is satellite equipment.

In one embodiment, the second node 1300 is a flight platform.

In one embodiment, the second transmitter 1301 comprises at least one of the antenna 420, the transmitter 418, the transmitting processor 416, the multi-antenna transmitting processor 471, the controller/processor 475 or the memory 476 in Embodiment 4.

In one embodiment, the second receiver 1302 comprises at least one of the antenna 420, the receiver 418, the receiving processor 470, the multi-antenna receiving processor 472, the controller/processor 475 or the memory 476 in Embodiment 4.

In one embodiment, the third receiver 1303 comprises at least one of the antenna 420, the receiver 418, the receiving processor 470, the multi-antenna receiving processor 472, the controller/processor 475 or the memory 476 in Embodiment 4.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The UE and terminal in the present disclosure include but are not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things (IOT), RFID terminals, NB-IOT terminals, Machine Type Communication (MTC) terminals, enhanced MTC (eMTC) terminals, data cards, low-cost mobile phones, low-cost tablet computers, etc. The base station or system device in the present disclosure includes but is not limited to macro-cellular base stations, micro-cellular base stations, home base stations, relay base station, gNB (NR node B), Transmitter Receiver Point (TRP), and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A first node for wireless communications, comprising:
a first receiver, used for receiving a first radio signal, and determining a first transmission parameter according to the first radio signal; receiving a second radio signal, and determining a first reception quality according to the second radio signal; and
a first processor, used for determining whether a connection is established to a transmitter for the first radio signal according to a reception quality with a first adjustment;
wherein the first transmission parameter is used to determine a first offset, a sum of the first offset and the first reception quality being equal to the reception quality with the first adjustment; the first transmission parameter is related to a distance between the first node and the transmitter for the first radio signal.

2. The first node according to claim 1, comprising:
the first receiver, receiving a first signaling, the first signaling indicating a first candidate offset set, the first candidate offset set being comprised of multiple candidate offsets, where the first offset is one of the multiple candidate offsets;
wherein the first transmission parameter is used for determining the first offset from the first candidate offset set.

3. The first node according to claim 1, comprising:
a first transmitter, transmitting an access request signal;
wherein the transmitter for the first radio signal is a target receiver for the access request signal.

4. The first node according to claim 1, comprising:
when the reception quality with the first adjustment continues to exceed a first reference by a first threshold and reaches a first time length, the first processor determines to establish a connection to the transmitter for the first radio signal.

5. The first node according to claim 1, comprising:
when the reception quality with the first adjustment exceeds a first reference by a second threshold, the first processor determines to establish a connection to the transmitter for the first radio signal.

6. The first node according to claim 1, characterized in that: the first radio signal is generated by RRC.

7. The first node according to claim 1, characterized in that: the longer the distance between the first node and the transmitter for the first radio signal, the greater the first transmission parameter.

8. The first node according to claim 1, characterized in that: the longer the distance between the first node and the transmitter for the first radio signal, the smaller the first offset.

9. The first node according to claim 1, characterized in that: the second radio signal comprises a reference signal, and the first reception quality comprises a receive power for the reference signal.

10. The first node according to claim 1, characterized in that: the first reception quality comprises an RSRP obtained by a measurement on the second radio signal; or, the first reception quality comprises an RSRQ obtained by a measurement on the second radio signal.

11. The first node according to claim 1, characterized in that: a channel occupied by the access request signal comprises a PRACH; a synchronization timing for reception of the first radio signal is used to determine a transmission timing for the access request signal.

12. The first node according to claim 1, characterized in that: a channel occupied by the access request signal comprises a PUSCH.

13. A second node for wireless communications, comprising:
a second transmitter, used for transmitting a first radio signal, and determining a first transmission parameter according to the first radio signal; transmitting a second radio signal, and determining a first reception quality according to the second radio signal;
wherein a reception quality with a first adjustment is used to determine whether a connection to the second node is established; the first transmission parameter is used to determine a first offset, a sum of the first offset and the first reception quality being equal to the reception quality with the first adjustment; the first transmission parameter is related to a distance between the first node and the second node.

14. The second node according to claim 13, comprising:
a second receiver, receiving an access request signal;
wherein the transmitter for the first radio signal is a target receiver for the access request signal.

15. A method in a first node for wireless communications, comprising:
receiving a first radio signal, and determining a first transmission parameter according to the first radio signal; receiving a second radio signal, and determining a first reception quality according to the second radio signal; and
determining whether a connection is established to a transmitter for the first radio signal according to a reception quality with a first adjustment;
wherein the first transmission parameter is used to determine a first offset, a sum of the first offset and the first reception quality being equal to the reception quality with the first adjustment; the first transmission parameter is related to a distance between the first node and the transmitter for the first radio signal.

16. The method in the first node according to claim 15, comprising:
receiving a first signaling, the first signaling indicating a first candidate offset set, the first candidate offset set being comprised of multiple candidate offsets, where the first offset is one of the multiple candidate offsets;

wherein the first transmission parameter is used for determining the first offset from the first candidate offset set.

17. The method in the first node according to claim 15, comprising:

transmitting an access request signal;

wherein the transmitter for the first radio signal is a target receiver for the access request signal.

18. A method in a second node for wireless communications, comprising:

transmitting a first radio signal, and determining a first transmission parameter according to the first radio signal; transmitting a second radio signal, and determining a first reception quality according to the second radio signal;

wherein a reception quality with the first adjustment is used to determine whether a connection to the second node is established; the first transmission parameter is used to determine a first offset, a sum of the first offset and the first reception quality being equal to the reception quality with the first adjustment; the first transmission parameter is related to a distance between the first node and the second node.

19. The method in the second node according to claim 18, comprising:

receiving an access request signal;

wherein the transmitter for the first radio signal is a target receiver for the access request signal.

\* \* \* \* \*